(12) United States Patent
Gentillet et al.

(10) Patent No.: US 7,209,334 B2
(45) Date of Patent: Apr. 24, 2007

(54) AUTO ADJUSTMENT OF OVER CURRENT PROTECTION IN DEGRADED MODE

(75) Inventors: Jerome Gentillet, Round Rock, TX (US); Lynn Simmons, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 335 days.

(21) Appl. No.: 10/984,064

(22) Filed: Nov. 9, 2004

(65) Prior Publication Data
US 2006/0098368 A1   May 11, 2006

(51) Int. Cl.
*H02H 3/08* (2006.01)
(52) U.S. Cl. ..................................... 361/93.1
(58) Field of Classification Search ................ 361/93.1
See application file for complete search history.

(56) References Cited

U.S. PATENT DOCUMENTS

| | | | | |
|---|---|---|---|---|
| 3,599,073 A | * | 8/1971 | Wilson et al. | 320/144 |
| 5,375,029 A | * | 12/1994 | Fukunaga et al. | 361/101 |
| 5,513,361 A | * | 4/1996 | Young | 713/320 |
| 6,631,064 B2 | * | 10/2003 | Schuellein et al. | 361/93.1 |
| 7,137,015 B2 | * | 11/2006 | Su | 713/300 |

* cited by examiner

*Primary Examiner*—Stephen W. Jackson
*Assistant Examiner*—Boris Benenson
(74) *Attorney, Agent, or Firm*—Baker Botts L.L.P.

(57) ABSTRACT

An information handling system having a power supply with automatic adjustment of over current protection for both normal and degraded modes of standby operation. A first over current protection shutdown value is used when the power supply cooling fan is operational and a second over current protection shutdown value is used when the power supply cooling fan is not operational. A fan fault detector selects between the first and second over current protection shutdown values.

24 Claims, 2 Drawing Sheets

AUTO ADJUSTMENT OF OVER CURRENT PROTECTION IN DEGRADED MODE

BACKGROUND OF THE INVENTION TECHNOLOGY

1. Field of the Invention

The present invention is related to information handling systems, and, more specifically, to automatic adjustment of over current protection in a degraded mode of a power supply of the information handling system.

2. Description of the Related Art

As the value and use of information continues to increase, individuals and businesses seek additional ways to process and store information. One option available to users are information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems, e.g., computer, personal computer workstation, portable computer, computer server, print server, network router, network hub, network switch, storage area network disk array, RAID disk system and telecommunications switch.

Many of the information handling systems are being placed in remote locations or may be unattended for long periods of time. The information handling systems are also being designed to meet government and industry requirements of being able to be placed into a low power standby mode, either automatically (after a time period of inactivity) or by remote command. However, some modules (circuits) of the information handling system must remain powered so as to allow wake-up of the information handling system from the low power standby mode when required by a user. As the information handling systems become more sophisticated and powerful, and/or multiple information handling systems share a common power supply unit (PSU), standby power requirements have increased to the point where the PSU requires airflow for cooling of its components.

In the case of a cooling fan failure in the PSU, the PSU standby voltages must be shut down in order to prevent catastrophic failure of the PSU and/or safety rule violations when the PSU components overheat. A PSU has a well defined safety specification that specifies maximum allowable values for over current protection, over temperature protection, short circuit protection, over voltage protection, under voltage protection and the like. In order to meet PSU safety specifications and/or prevent catastrophic PSU failures because of high component temperatures caused by cooling fan failures, PSU designers have used the following procedures: (1) Shutdown of the PSU voltages used for standby conditions. This is the simplest and least costly, but does not allow the information handling system to run in standby so that there can be remote access thereof. (2) Over temperature protection of the PSU standby power circuits. This allows the information handling system to be in a standby mode until a PSU standby power components begins to overheat, then the PSU must be shut down. This is the most robust for available standby operation, but is also the most costly since temperature sensors and discreet temperature monitoring circuits are required. (3) Shutdown of the PSU voltages used for standby conditions for a time defined by the time it takes to reach safe standby operation based upon worst case component cool down of overheating conditions. This may allow information handling system remote standby availability, but without the costly components necessary for the over temperature protection discussed hereinabove.

Therefore, what is needed is a solution for keeping maximum availability of a PSU standby voltage output(s) operational during a cooling fan failure while minimizing the cost and number of components required.

SUMMARY OF THE INVENTION

The invention remedies the shortcomings of the prior art by providing an information handling system power supply having automatic adjustment of over current protection when in a degraded operating mode, e.g., due to cooling fan failure. An over current protection circuit monitors current drawn by the information handling system when in a standby condition. Normally, a fan(s) will cool the information handling system power supply even when the information handling system is in the standby mode of operation. When the cooling fan is properly operating, the power supply capabilities are characterized at a maximum current, however, when there is a cooling fan failure the power supply can go into a thermal run away condition if this maximum current is reached. Operation of the power supply may also be characterized when there is no fan cooling available, e.g., a cooling fan failure. Therefore, the power supply may still supply standby operating voltages to the information handling system, even when the cooling fan has failed, by insuring that the power supply cannot exceed a degraded mode maximum current.

According to an exemplary embodiment of the invention, an over current protection circuit of the power supply has two maximum current trip values. A first maximum current trip point is characterized when the power supply has a cooling fan that is operating properly, and a second maximum current trip point is characterized when the cooling fan that is not operating properly. The second maximum current trip point is less than the second maximum current trip point and is selected so that the power supply components will not go into thermal run away when there is no fan cooling. Current needed by the information handling system when in a standby mode of operation is coupled from the power supply through a series connected resistor to the information handling system. A voltage drop proportional to the current is generated across this series connected resistor according to Ohm's law.

A voltage comparator monitors this voltage drop in comparison with a predefined over current trip voltage derived through a voltage divider network comprising series connected resistors. The greater the standby current drawn by the information handling system, the greater will be the voltage drop across the series connected resistor, i.e., the standby voltage to the information handling system will be at a lower voltage than at the power supply. The lower voltage at the information handling system slight and not a problem in operation of thereof, however the lower voltage may be easily detected by the voltage comparator as being below a certain reference voltage, or equal to or greater than the certain voltage. Thus certain reference voltages may be selected to operate the voltage comparator at certain current values relative to standby operation of the information handling system. As described above, a first reference voltage may be selected so as cause the voltage comparator to have a logic level change at its output for a first current value (normal mode operation, fan operational), and a second reference voltage may be likewise selected for a logic change at a second current value (degrade mode operation, no fan).

A voltage divider comprising series connected resistors may be used to obtain the first and second reference voltages. A switch, e.g., bipolar transistor, field effect transistor (FET), relay contact, etc., coupled in parallel with one of these series connected resistors may be used to generate either the first or the second reference voltage to the voltage comparator. The switch may be controlled by a fan fault detection circuit that is adapted to close the switch when there is a fan fault, e.g., no forced cooling air over the power supply components. This is a simple, effective, reliable and low cost way of obtaining maximum power supply availability during information system standby operating conditions even when the power supply capacity is degraded because of inadequate cooling thereof.

A technical advantage of the present invention is automatic selection of maximum over current protection for both normal and degraded operation of a power supply during standby operation of an information handling system. Another technical advantage is simple, reliable and low cost implementation of over current protection for a power supply that must supply power to an information handling system in a standby mode. Other technical advantages should be apparent to one of ordinary skill in the art in view of what has been disclosed herein.

BRIEF DESCRIPTION OF THE DRAWINGS

A more complete understanding of the present disclosure and advantages thereof may be acquired by referring to the following description taken in conjunction with the accompanying drawings wherein.

Figure 1:
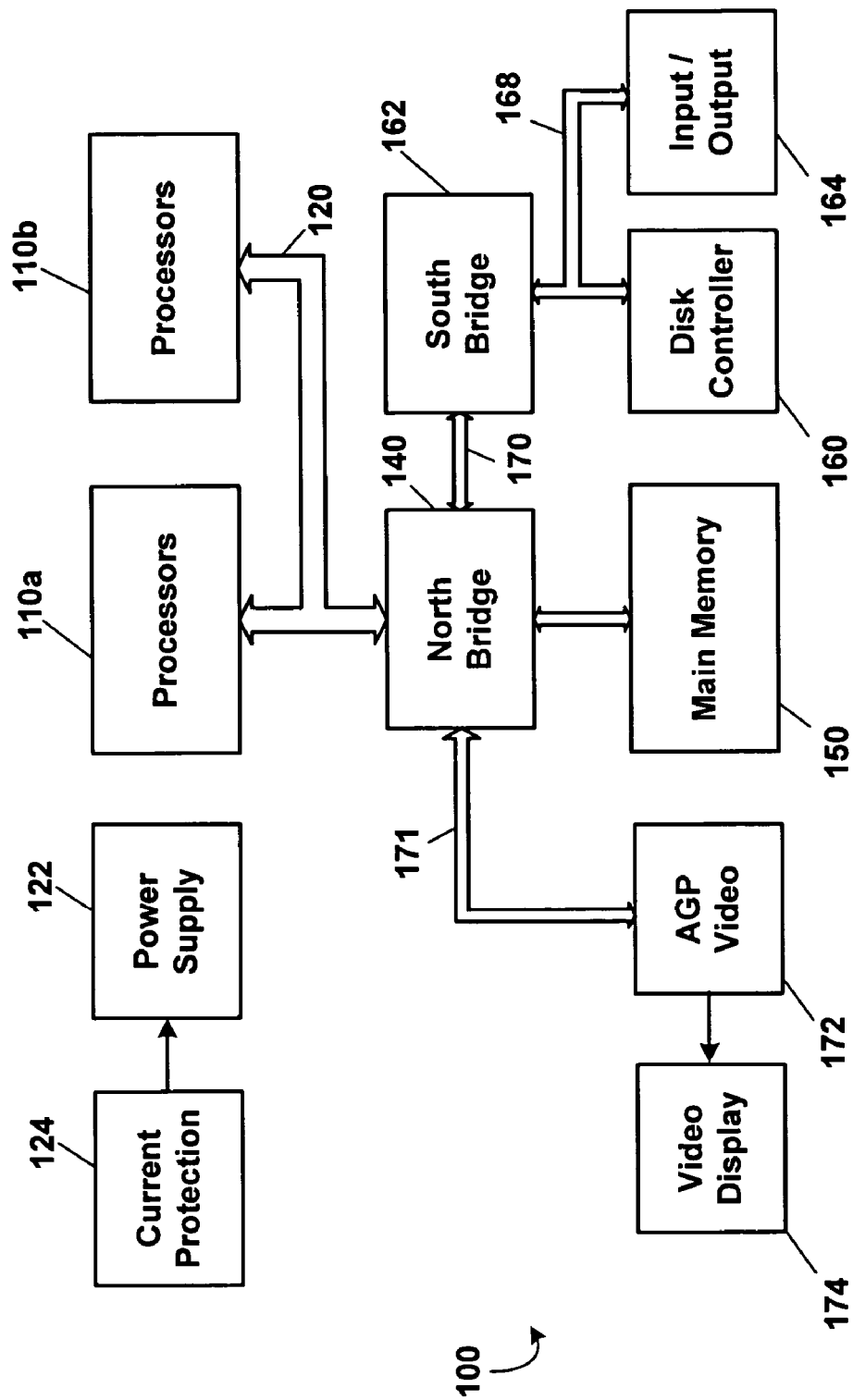
FIG. 1 is a schematic block diagram of an exemplary embodiment of an information handling system in combination with the invention.

The present invention may be susceptible to various modifications and alternative forms. Specific exemplary embodiments thereof are shown by way of example in the drawing and are described herein in detail. It should be understood, however, that the description set forth herein of specific embodiments is not intended to limit the present invention to the particular forms disclosed. Rather, all modifications, alternatives, and equivalents falling within the spirit and scope of the invention as defined by the appended claims are intended to be covered.

DETAILED DESCRIPTION OF SPECIFIC EMBODIMENTS

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU), hardware or software control logic, read only memory (ROM), and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring now to the drawings, the details of a specific exemplary embodiment of the present invention is schematically illustrated. Like elements in the drawings will be represented by like numbers, and similar elements will be represented by like numbers with a different lower case letter suffix.

Referring to FIG. 1, an information handling system is illustrated having electronic components mounted on at least one printed circuit board (PCB) (motherboard) and communicating data and control signals therebetween over signal buses. In one embodiment, the information handling system is a computer system. The information handling system, generally referenced by the numeral 100, comprises a processor(s) 110 coupled to a host bus 120. A north bridge 140, which may also be referred to as a memory controller hub or a memory controller, is coupled to a main system memory 150. The north bridge 140 is coupled to the system processor(s) 110 via the host bus(es) 120. The north bridge 140 is generally considered an application specific chip set that provides connectivity to various buses, and integrates other system functions such as a memory interface. For example, an Intel 820E and/or 815E chip set, available from the Intel Corporation of Santa Clara, Calif., provides at least a portion of the north bridge 140. The chip set may also be packaged as an application specific integrated circuit (ASIC). The north bridge 140 typically includes functionality to couple the main system memory 150 to other devices within the information handling system 100. Thus, memory controller functions, such as main memory control functions, typically reside in the north bridge 140. In addition, the north bridge 140 provides bus control to handle transfers between the host bus 120 and a second bus(es), e.g., PCI bus 170, AGP bus 171 coupled to video graphics display 174, etc. A second bus(es) 168 may also comprise other industry standard buses or proprietary buses, e.g., ISA, SCSI, USB buses through a south bridge(s) (bus interface) 162. These secondary buses 168 may have their own interfaces and controllers, e.g., ATA disk controller 160 and input/output interface(s) 164, and interface with a disk controller, a network interface card, a graphics controller, a hard disk and the like. A power supply 122 is coupled to and powers the information handling system 100. An automatic over current protection adjustment device 124 protects the power supply 122 when supplying standby power to the information handling system 100 for both normal standby and fan fault operating conditions of the power supply.

Figure 2:
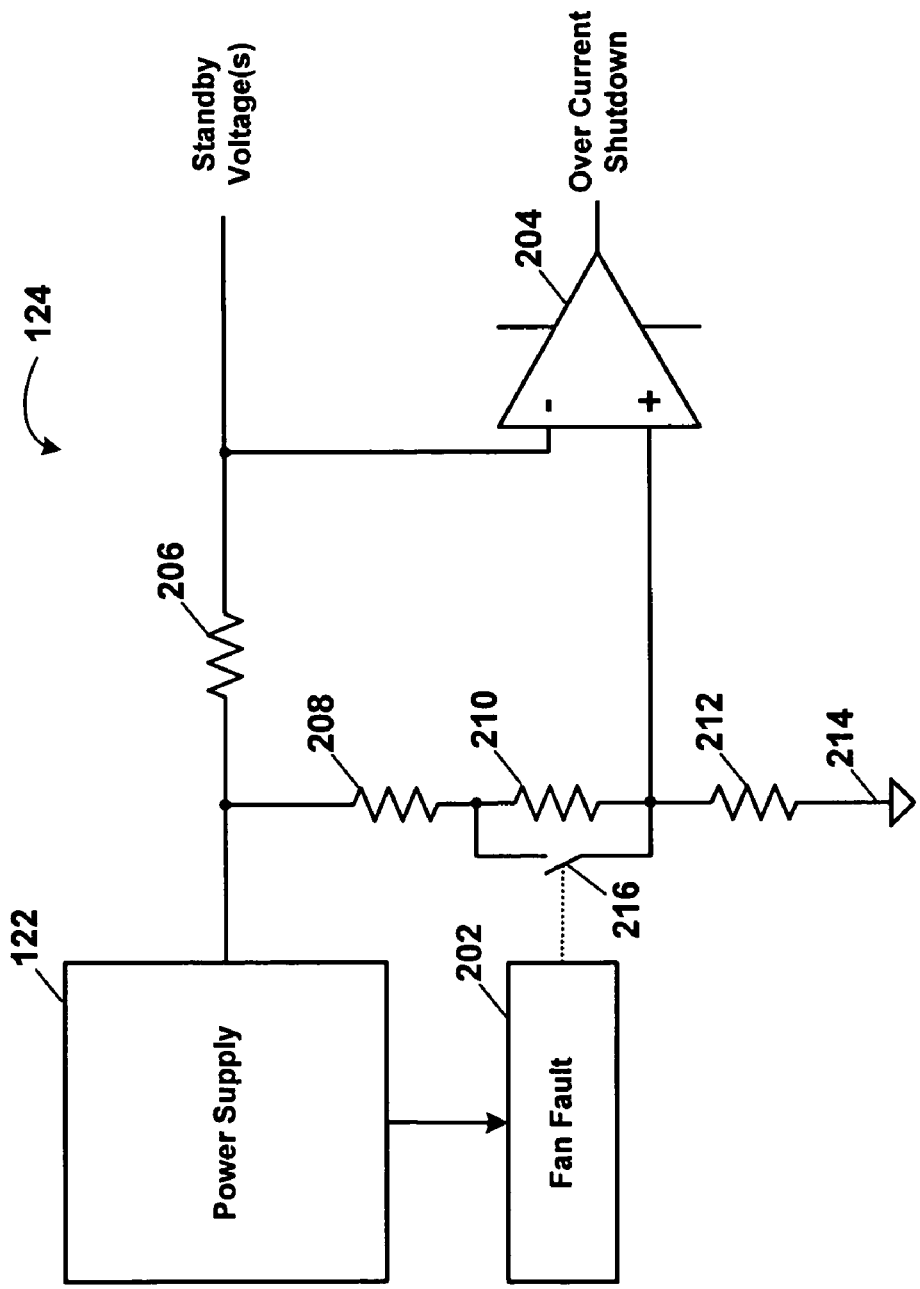
FIG. 2 is a schematic diagram of an automatic over current protection adjustment circuit for both normal standby and fan fault operating conditions of a power supply, according to a specific exemplary embodiment of the invention.

Referring to FIG. 2, depicted is a schematic diagram of an automatic over current protection adjustment circuit for both normal standby and fan fault operating conditions of a power supply, according to a specific exemplary embodiment of the invention. The automatic over current protection adjustment circuit, generally represented by the numeral 124, comprises a voltage comparator 204, series connected resistors 208, 210 and 212 used for deriving reference voltages, a current measuring resistor 206, and a switch 216. The negative (−) input of the comparator 204 measures the voltage after the voltage drop caused by current flowing through the resistor 206. The series connected resistors 208, 210 and 212 are coupled between the output of the power supply 122 and a common or ground 214, and create a reference voltage at the positive (+) input of the comparator 204. When the switch 216 is open, all of the series connected resistors 208, 210 and 212 are in the voltage divider circuit and create a first reference voltage at the positive input of the comparator 204. The switch 216 is controlled by a fan fault circuit 202 that is adapted to determine whether a power supply fan (not shown) is operating properly. When the power supply fan is operating properly, the switch 216 is open and the resistor 210 is part of the voltage divider network. When the power supply fan is not operating properly then the fan fault circuit 202 closes the switch 216 which shorts out the resistor 210. With the resistor 210 effectively out of the voltage divider circuit, a second reference voltage is created which is greater (higher) than the first reference voltage. Now the comparator 204 will indicate an over current shutdown condition when less current is being drawn through the resistor 206 because the positive input is at the second reference voltage. Thus, the power supply is over current protected for both normal and degraded (cooling fan inoperative) standby operation.

The invention, therefore, is well adapted to carry out the objects and to attain the ends and advantages mentioned, as well as others inherent therein. While the invention has been depicted, described, and is defined by reference to exemplary embodiments of the invention, such references do not imply a limitation on the invention, and no such limitation is to be inferred. The invention is capable of considerable modification, alteration, and equivalents in form and function, as will occur to those ordinarily skilled in the pertinent arts and having the benefit of this disclosure. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for automatic adjustment of over current protection of a power supply for both normal and degraded modes of standby operation of an information handling system, said method comprising the steps of:
    determining standby current of an information handling system;
    determining whether a power supply cooling fan is operating, wherein
        if the power supply cooling fan is operating then generating an over current shutdown if the information handling system standby current is greater than a first reference value, and
        if the power supply cooling fan is not operating then generating the over current shutdown if the information handling system standby current is greater than a second reference value, wherein the second reference value causes generation of the over current shutdown at a lower standby current than the first reference value.

2. The method according to claim 1, wherein the step of determining standby current is done with a series connected resistor that creates a voltage drop proportional to the standby current.

3. The method according to claim 2, wherein the step of generating the over current shutdown is done with a voltage comparator.

4. The method according to claim 3, wherein the first and second reference values are first and second reference voltages, respectively, derived from a voltage divider.

5. The method according to claim 4, wherein the first and second reference voltages are selected with a switch controlled by a fan fault detector.

6. The method according to claim 5, wherein the switch is a transistor.

7. The method according to claim 6, wherein the transistor is a bipolar transistor.

8. The method according to claim 6, wherein the transistor is a field effect transistor.

9. An information handling system having a power supply with automatic adjustment of over current protection for both normal and degraded modes of standby operation, said system comprising:
    an information handling system having a standby mode of operation;
    a power supply adapted for providing voltages necessary to power the information handling system when in the standby mode of operation;
    a cooling fan fault detector for determining whether a power supply cooling fan is operational; and
    a standby over current protection module for protecting the power supply from an over current condition when the information handling system is in the standby mode of operation, wherein the standby over current protection module is coupled to the cooling fan fault detector so that when the power supply cooling fan is operational the over current condition is at a greater current value than when the power supply cooling fan is not operational.

10. The information handling system according to claim 9, wherein the standby over current protection module comprises:
    a voltage comparator;
    a reference voltage circuit coupled to the cooling fan fault detector and the voltage comparator, wherein the reference voltage circuit generates a first reference voltage when the cooling fan is operational and a second reference voltage when the cooling fan is not operational; and
    a current measuring circuit having a voltage output that is representative of the information handling system standby current, wherein the current measuring circuit voltage output is compared to the first reference voltage when the cooling fan is operational and to the second reference voltage when the cooling fan is not operational.

11. The information handling system according to claim 10, wherein the reference voltage circuit is a voltage divider circuit comprising a plurality of resistors connected in series such that a first end is coupled to the power supply output, a second end is coupled to a power supply common, and a one of the plurality of resistors coupled to the cooling fan fault detector such that when the cooling fan is operational the one of the plurality of resistors is part of the voltage divider circuit and when the cooling fan is not operational the one of the plurality of resistors is not part of the voltage divider circuit.

12. The information handling system according to claim 11, wherein the one of the plurality of resistors is coupled in parallel with a switched output of the cooling fan fault detector.

13. The information handling system according to claim 12, wherein the switched output of the cooling fan fault detector is a transistor.

14. The information handling system according to claim 13, wherein the transistor is a bipolar transistor.

15. The information handling system according to claim 13, wherein the transistor is a field effect transistor.

16. The information handling system according to claim 12, wherein the switched output of the cooling fan fault detector is a relay contact.

17. An apparatus for automatic adjustment of over current protection for both normal and degraded modes of standby operation of a power supply, comprising:
 a power supply having a standby mode of operation;
 a cooling fan fault detector for determining whether a power supply cooling fan is operational; and
 a standby over current protection module for protecting the power supply from an over current condition, wherein the standby over current protection module is coupled to the cooling fan fault detector so that when the power supply cooling fan is operational the over current condition is at a greater current value than when the power supply cooling fan is not operational.

18. The apparatus according to claim 17, wherein the standby over current protection module comprises:
 a voltage comparator;
 a reference voltage circuit coupled to the cooling fan fault detector and the voltage comparator, wherein the reference voltage circuit generates a first reference voltage when the cooling fan is operational and a second reference voltage when the cooling fan is not operational; and
 a current measuring circuit having a voltage output that is representative of the information handling system standby current, wherein the current measuring circuit voltage output is compared to the first reference voltage when the cooling fan is operational and to the second reference voltage when the cooling fan is not operational.

19. The apparatus according to claim 18, wherein the reference voltage circuit is a voltage divider circuit comprising a plurality of resistors connected in series such that a first end is coupled to the power supply output, a second end is coupled to a power supply common, and a one of the plurality of resistors coupled to the cooling fan fault detector such that when the cooling fan is operational the one of the plurality of resistors is part of the voltage divider circuit and when the cooling fan is not operational the one of the plurality of resistors is not part of the voltage divider circuit.

20. The apparatus according to claim 19, wherein the one of the plurality of resistors is coupled in parallel with a switched output of the cooling fan fault detector.

21. The apparatus according to claim 20, wherein the switched output of the cooling fan fault detector is a transistor.

22. The apparatus according to claim 21, wherein the transistor is a bipolar transistor.

23. The apparatus according to claim 21, wherein the transistor is a field effect transistor.

24. The apparatus according to claim 20, wherein the switched output of the cooling fan fault detector is a relay contact.

* * * * *